(12) United States Patent
Fang

(10) Patent No.: US 9,367,782 B2
(45) Date of Patent: Jun. 14, 2016

(54) HIGH CAPACITY 2D COLOR BARCODE AND METHOD FOR DECODING THE SAME

(71) Applicant: KONICA MINOLTA LABORATORY U.S.A., INC., San Mateo, CA (US)

(72) Inventor: Gang Fang, Redwood City, CA (US)

(73) Assignee: KONICA MINOLTA LABORATORY U.S.A., INC., San Mateo, CA (US)

(*) Notice: Subject to any disclaimer, the term of this patent is extended or adjusted under 35 U.S.C. 154(b) by 57 days.

(21) Appl. No.: 14/290,595

(22) Filed: May 29, 2014

(65) Prior Publication Data

US 2015/0347886 A1    Dec. 3, 2015

(51) Int. Cl.
*G06K 19/06* (2006.01)
*G06K 7/14* (2006.01)

(52) U.S. Cl.
CPC .......... *G06K 19/0614* (2013.01); *G06K 7/1417* (2013.01); *G06K 7/1426* (2013.01); *G06K 19/06037* (2013.01); *G06K 2019/06225* (2013.01)

(58) Field of Classification Search
CPC .............. G06K 7/1417; G06K 7/1426; G06K 19/0614; G06K 19/06037
USPC .................................................. 235/462.04
See application file for complete search history.

(56) References Cited

U.S. PATENT DOCUMENTS

| 5,818,032 | A | 10/1998 | Sun et al. | |
|---|---|---|---|---|
| 7,751,585 | B2 | 7/2010 | Jancke | |
| 7,913,922 | B1 | 3/2011 | Roth | |
| 8,534,560 | B2 * | 9/2013 | Endo | G06K 7/12 235/462.04 |
| 2005/0023354 | A1 | 2/2005 | Sali et al. | |
| 2007/0278303 | A1 | 12/2007 | Cattrone | |
| 2009/0242649 | A1 * | 10/2009 | Mizukoshi | G06K 19/06037 235/494 |
| 2011/0110586 | A1 * | 5/2011 | Takura | G06K 19/06037 382/166 |
| 2011/0186632 | A1 | 8/2011 | Yi et al. | |
| 2014/0144991 | A1 | 5/2014 | Tian et al. | |

OTHER PUBLICATIONS

Mayer et al., "Design of High Capacity 3D Print Codes Aiming for Robustness to the PS Channel and External Distortions", IEEE, 2009, pp. 105-108.
Parikh, et al., "Localization and Segmentation of a 2D High Capacity Color Barcode", IEEE Workshop on Applications of Computer Vision, 2008, WACV 2008, pp. 1-7.
Querini et al., "Color Classifiers for 2D Color Barcode", Proceedings of the 2013 Federated Conference on Computer Science and Information Systems, 2013, pp. 611-618.
Hao et al., "COBRA: Color Barcode Streaming for Smartphone Systems", Proceedings of the 10th international conference on Mobile systems, applications and services, 2012, pp. 85-98.

* cited by examiner

*Primary Examiner* — Toan Ly
(74) *Attorney, Agent, or Firm* — Chen Yoshimura LLP

(57) ABSTRACT

A 2D color barcode layout is disclosed. The barcode includes a 2D array of data cells, four corner locators, and border reference cells forming four borders between the corner locators that substantially surround the array of data cells. Each data cell and border reference cell has one of four primary colors (e.g. CMYK). Most border reference cells have the same size as the data cells, except for yellow ones which are longer. The border reference cells form a repeating color sequence along the borders, and are used during decoding to calculate (1) the channel offset (a spatial offset) of each primary color at different locations along the borders and (2) the reference (average) color values of each primary color. During decoding, the color values of each data cell is measured while taking into account channel offset which is calculated by interpolating the channel offset of the border reference cells.

16 Claims, 5 Drawing Sheets

HIGH CAPACITY 2D COLOR BARCODE AND METHOD FOR DECODING THE SAME

BACKGROUND OF THE INVENTION

1. Field of the Invention

This invention relates to two-dimensional (2D) color barcodes, and in particular, it relates to the structure of a two-dimensional color barcode and method for decoding the same.

2. Description of Related Art

Barcode is an optical machine-readable representation of data. A 2D color barcode is formed of small square or rectangular cells arranged in a two-dimensional manner, e.g., in both horizontal and vertical directions, and one color is used for each cell. Different colors represent different data values. The relation between the data capacity of the barcode and the cell number and the number of colors can be expressed as $$\text{Data capacity} = (\text{Cell Number}) \times \log_2(\text{Num of color representations})$$

A barcode design that uses small cell sizes and more color representations can achieve a relatively high data capacity in a given area. However, various factors limit how small cells can be.

Channel offset of digital printers is an inevitable effect caused by hardware imperfections. Channel refers to the different primary colors used by the printer (e.g. cyan, magenta, yellow, and black or CMYK); channel offset refers to the fact that when pixels having the same position values are printed using different primary colors, the actual position of the printed pixels may not be exactly the same. The offset amount may be global (i.e. the same offset across the entire page) and/or local (i.e. they may be different in different areas of a page). When barcode cells are small, the channel offset effect may affect the result noticeably, causing the space between neighboring cells to vary and cells can even merge into each other.

Also, the color density of a cell depends on the cell area. The color density of a small area is relatively low when compared with that of a large area, which may cause difficulty in color determination for barcode with small cells.

Furthermore, the working conditions of different printers and scanners are variable. Different printers will have different output, so will different scanners. The working conditions may also vary with time, so that the output from one printer or one scanner at different times may also vary.

SUMMARY

Embodiments of the present invention provide a design of 2D color barcode layout and a robust algorithm which can decode the barcode to reduce the impact of variations of the conditions of the scanners and printers.

An object of the present invention is to provide a high capacity 2D color barcode design and a robust method for decoding the barcode that works well under the physical limitations of printers and scanners discussed above, a method that can decrease error rate of decoding in spite of the variations from the scanners and the printers.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a printed two-dimensional color barcode which includes: a plurality of data cells each having one of a plurality of primary colors, the data cells having identical sizes and being arranged to form a two-dimensional array containing a plurality of columns and rows separated by white spaces; a plurality of corner locator cells located at corners of the barcode, the corner locator cells having a black color and having a size larger than the size of the data cells; and a plurality of border reference cells each having one of the plurality of primary colors, arranged to form four borders located between the corner locator cells and substantially surrounding the two-dimensional array of data cells, and the border reference cells in each border between two corner locator cells having a predetermined repeating color sequence including the plurality of primary colors.

In another aspect, the present invention provides a method for decoding a two-dimensional color barcode in a scanned image, the barcode having a known layout comprising a plurality of data cells forming a two-dimensional array containing a plurality of columns and rows separated by white spaces, a plurality of corner locator cells located at corners of the barcode, and a plurality of border reference cells forming four borders located between the corner locator cells and substantially surrounding the two-dimensional array of data cells, each data cell and border reference cell having one of a plurality of primary colors, the data cells and some of the border reference cells having identical sizes, the corner locator cells having a black color and a size larger than the size of the data cells, the border reference cells in each border between two corner locator cells having a predetermined repeating color sequence including the plurality of primary colors, the decoding method including: (a) calculating center positions of all data cells and border reference cells using positions of the corner locator cells; (b) using all of the border reference cells, calculating a channel offset for each primary color at multiple positions along each border; (c) calculating reference color values for each primary color by averaging color values of pixels in all border reference cells having the respective primary color; (d) for each pixel within an area of the data cell array: (d1) calculate a plurality of color difference values, each being a color difference between color values of the pixel and the reference color values of one of the primary colors or white; (d2) based on the color difference values, calculating a plurality of pixel color probabilities with respect to the plurality of primary colors, each representing a probability of the pixel being the corresponding primary color; (e) for each data cell: (e1) calculating a plurality of predicted positions of the cell corresponding to the plurality of primary colors, each predicted position being calculated by adding a local channel offset for the corresponding primary color to the center position of the data cell calculated in step (a), wherein the local channel offset is calculated by interpolating the channel offset for the corresponding primary color at the multiple positions along the four borders calculated in step (b); (e2) calculating a plurality of cell color probabilities with respect to the plurality of primary colors, each representing a probability of the data cell being the corresponding primary color, each being calculated by summing the pixel color probability with respect to the corresponding primary color over pixels located in an area having a size of the data cell and centered at the predicted position for the corresponding primary color; (e3) determining a color of the data cell by comparing the plurality of cell color probabilities with respect to the plurality of primary colors; and (f) converting the colors of the data cells to digital data.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
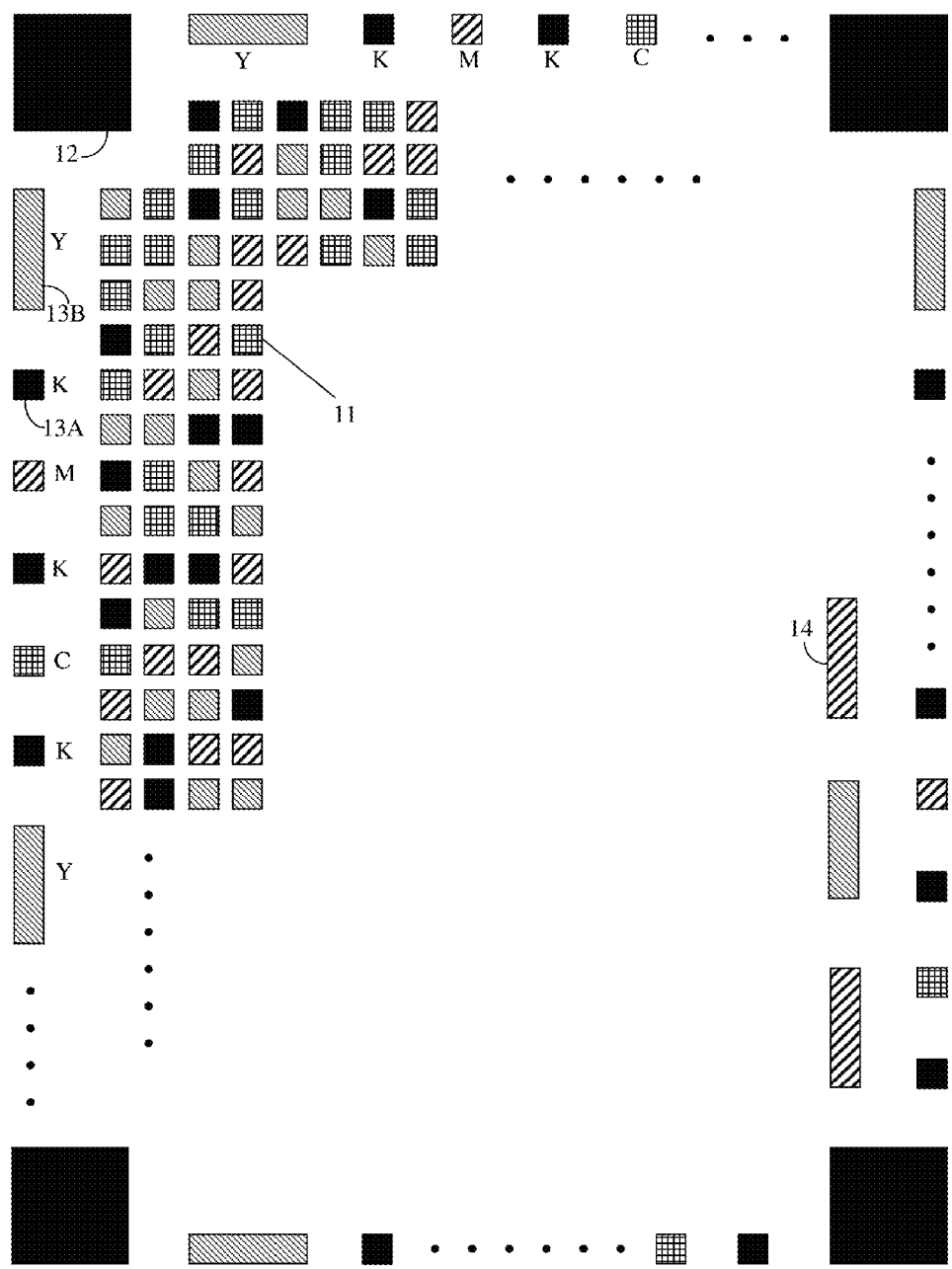
FIG. 1 depicts a color barcode layout according to an embodiment of the present invention.

FIG. 1 depicts the layout of an exemplary color barcode according to an embodiment of the present invention. The color barcode includes a plurality of data cells 11 forming a two-dimensional array, each cell having one of a plurality of colors. In a preferred embodiment, the plurality of colors are cyan (C), magenta (M), yellow (Y), and black (K), and each cell can represent 2 bits of information. CMYK are the primary colors used in printers, and each of them is printed by one colored ink and referred to as a color channel. Therefore, each cell in the barcode is printed with one ink, and the color of each cell will be uniform. Each cell has a defined size, and cells are separated by defined distances. Preferably the cells are square shaped, form columns and rows that are aligned in the vertical and horizontal directions, and the row distance and column distance are equal. In one particular embodiment, the cell size is 3×3 pixels and the distance (the width of the white space) between cells is 2 pixels in both horizontal and vertical directions.

The barcode has four corner locator cells 12 located at the corners of the barcode and a line of border reference cells 13A, 13B on each of the four sides of the barcode located between the corner locators, such that the array of data cells 11 are located inside the borders. The corner locators 12, which can be used during decoding to give the location of the four corners of the barcode, are preferably black in color and larger than the data cells. In this example, they are 13×13 pixels in size, i.e., their size corresponds to a 3×3 block of data cells in the inside array. The larger size makes them relatively easy to locate.

The border reference cells 13A, 13B include cyan, magenta, yellow and black reference cells that are arranged in a predefined color sequence. The reference cells can provide channel offset (global and local) information and color information that is useful in the decoding process. In one embodiment, the cyan, magenta and black reference cells 13A have the same size as the data cells 11, so that the color densities of these reference cells are similar to those of the data cells, while the yellow reference cells 13B are longer than the data cells. This is because the yellow color is close to the white background and is more difficult to detect accurately. In this example, the yellow reference cells 13B are 3×13 or 13×3 pixels in size; i.e., their size corresponds to a 1×3 or 3×1 block of data cells in the inside array. The border reference cells 13A, 13B are separated from each other and from the corner locators 12 by a larger distance than the cell separation in the inside data cell array in order to avoid the potential overlap of reference cells. In this example, the distance (the white space) between two adjacent reference cells, between the corner location and the adjacent reference cells, and the between reference cells and adjacent data cells is 7 pixels; this distance corresponds to the distance between two columns (or rows) in the inside data cell array if every other column (or row) were removed.

In this example, the predefined color sequence of the border references cells is a repeating sequence of Y, K, M, K, C, K, . . . ; i.e., every other reference cell is black, and the reference cells between black reference cells form a repeating color sequence (with yellow cells bring larger). Four lines of border reference cells arranged in this manner extend along the entire lengths of the four sides of the barcode between the corner locators. This allows channel offsets of the reference cells to be measured in different areas of the barcode and used to estimate the local channel offsets of data cells at any position within the barcode.

An asymmetry is designed so that one of the four corner locators can be distinguished from the others, which is useful in the decoding process. This may be achieved in any suitable ways. In one example, the asymmetry is achieved by the particular sequence of border reference cells. For example, in the illustrate example in FIG. 1, only the upper-left corner locator has a sequence of YKMKCK . . . extending from it in both clockwise and counter-clockwise directions; the sequence that extends from the other corner locators are different (not shown in FIG. 1).

Adjacent to one of the corner locators (the lower-right one in the illustrated example), and immediately inside a border formed by border reference cells, a line of larger cells 14 is provided to encode the data length and ECC of the barcode. In this example, these cells (referred to as the verification data cells) have the same size as the yellow reference cells 13B, and they are separated from each other and from the adjacent border reference cells and data cells by the same distance that separates the border reference cells from each other, i.e. 7 pixels in this example. In one example, 12 verification data cells are provided.

In the barcode layout of these embodiments, all cells, namely data cells, corner locators, border reference cells and verification data cells, are aligned on the same rectangular or square grid, i.e., the centers of all cells are located on grid points of the grid. This requires larger cells to cover odd numbers of columns and/or rows. Such a design can help avoid certain errors caused by dividing the image into cells. Also, the non-data cells are separated from other cells by a wider distance (e.g. 7 pixels) than the distance between data cells (e.g. 2 pixels), which can help to avoid the overlap of different color channels in these non-data cells.

In one particular example, the grid for a barcode has 134 columns and 134 rows, and the barcode contain nine sets of colored border reference cells on each side. Excluding the white spaces, the corner locators, the border reference cells and the verification data cells, 16788 data cells can be used to store information in each barcode. Multiple barcodes can be placed adjacent to each other on the same page with a white space of, for example, 20 pixels between them. For a print resolution of 600 dpi, a barcode will take about 1.15×1.15 square inches of space. Thus, up to 6×9 bar codes may be placed on a letter sized page.

Figure 1A:
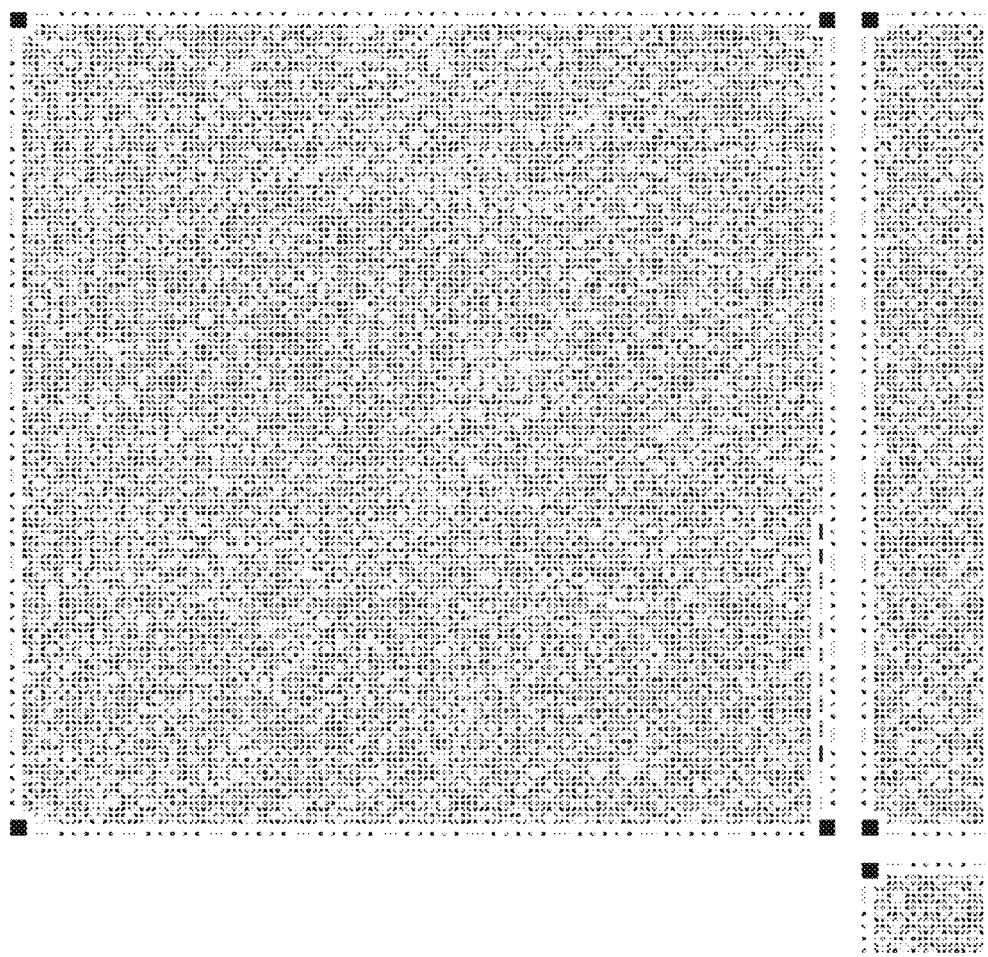
FIG. 1A (color) depicts one exemplary color barcode and portions of adjacent bar codes according to an embodiment of the present invention.

An exemplary 2D color barcode and portions of adjacent color barcodes are illustrated in FIG. 1A.

Two features of the above-described 2D color barcode design are noted here: First, the border reference cells, except for the yellow ones, have the same size as the data cells. The yellow border reference cells are longer (or wider) but have the same width (or height) as the data cells. Second, the border reference cells form borders that substantially entirely surround the data cells. These features contribute to improved decoding accuracy for 2D color barcodes formed of data cells of small size.

Figure 2:
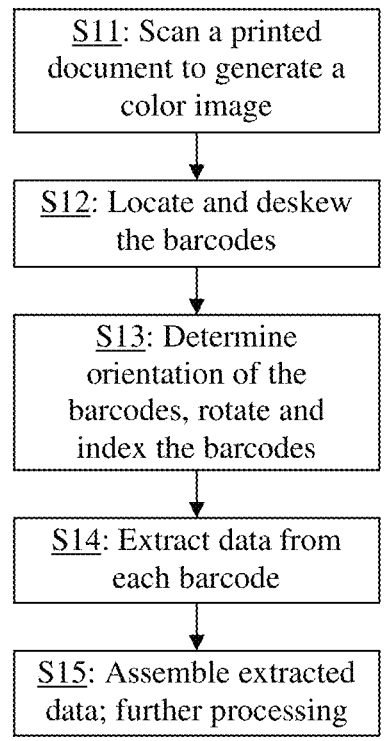
FIGS. 2, 2A and 2B schematically illustrate a barcode decoding method according to an embodiment of the present invention.

A decoding method for decoding barcodes having the above-described layout design is described below with reference to FIGS. 2, 2A and 2B. A printed document to be processed contains one or more of such barcodes arranged side by side. After the printed document is scanned into a color image (step S11), the color barcodes are first located and deskewed in step S12, which is further explained with reference to FIG. 2A. In a preferred embodiment, the spatial resolution of the scan is the same as the printing resolution. In other embodiments, the scan resolution can be higher than the printing resolution.

Figure 2A:
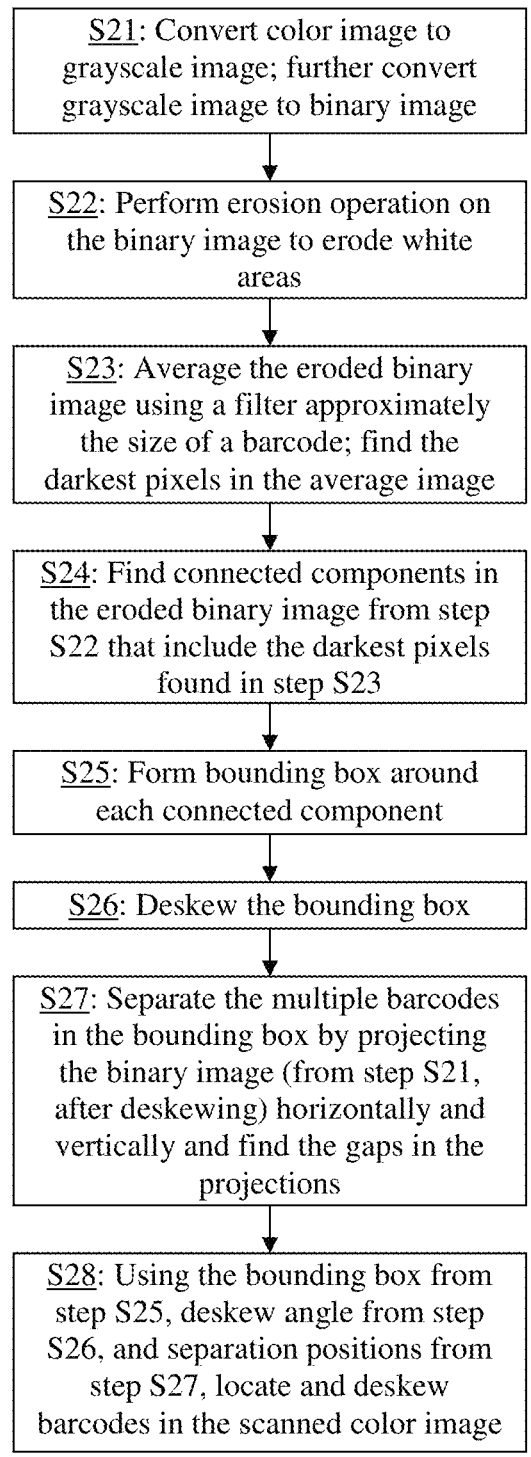
Figure 2B:
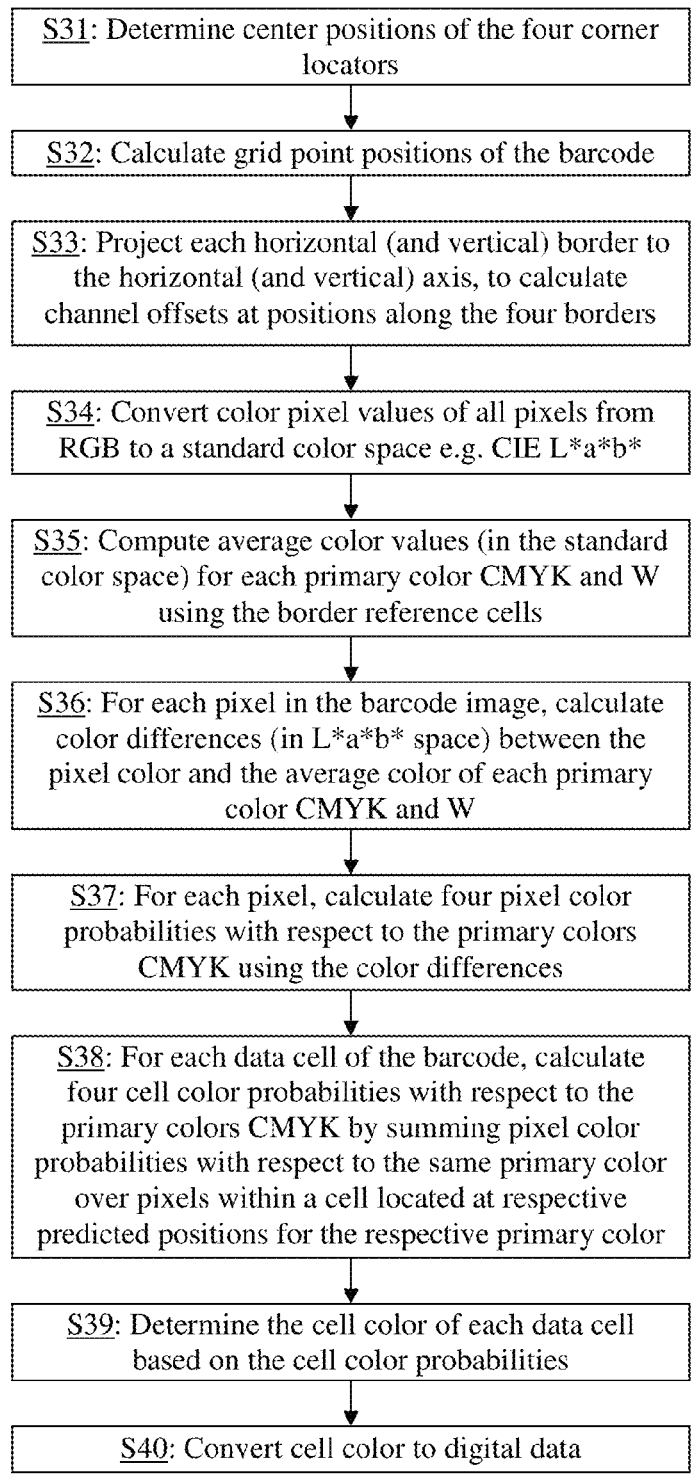

As shown in FIG. 2A, first, the color image is converted to a grayscale image, and then further converted to a binary (black and white) image (step S21). The color image generated by the scanner is typically an RGB image, and any suitable formula may be used to convert the RGB color values to grayscale values. Any suitable binarization method and threshold values may be used to convert the grayscale image to a binary image. It is not important whether the cyan, yellow and magenta cells are converted to black or not (although in practice, yellow will tend to become white and magenta will tend to become black), as long as black cells are converted to black in the binary image.

Next, an erosion algorithm is applied to the binary image to erode the white areas, using a relatively large structuring element (step S22). Note that eroding the white area is mathematically equivalent to dilating the black areas. Erosion and dilation are well known morphological operations. In one embodiment, the structuring element used in the erosion is a square of 30×30 pixels or a disk of 30 pixels in diameter. As a result of the erosion, the white areas will shrink and the black areas will grow; and because of the relatively large size of the structuring element, black cells in the barcodes are typically merge together, and adjacent barcodes are also merged together, resulting in a large black block having approximately the same shape as and slightly larger size than the areas of the page occupied by the multiple barcodes.

The eroded binary image may also contain noise in the form of black spots that are much smaller than the barcodes. Steps S23 and S24 are performed to remove such noise. In step S23, an averaging operation is applied to the eroded binary image using a filter having approximately the size of a barcode. This gives a grayscale image where the boundaries of the large black block become a light gray blur; the noise spots will become light gray areas due to the large filter size. The darkest pixels in this grayscale image are also located in step S23. These darkest pixels will not include the light gray blur that correspond to the noise spots. Then, using the eroded binary image from step S22, the connected components in the eroded binary image that include the locations of the darkest pixels in the average image in step S23 are determined (step S24). A connected component in a binary image is an object formed by the same colored (black in this case) pixels that are connected to each other. These connected components found in step S24 will correspond to the locations of the barcodes and will not include the noise spots. Typically, when multiple barcodes are located relatively close to each other, one connected component will be formed that includes the areas occupied by the multiple barcodes.

A minimum bounding box is formed around each connected component found in step S24 (step S25). Each bounding box constitutes the areas where barcodes (one or multiple closely adjacent barcodes) are located. The binary image within each bounding box is deskewed so that the boundaries of the connected component become vertical and horizontal (step S26). Any suitable method may be used for deskew.

Because the bounding box may include multiple barcodes, the multiple barcodes are separated by projecting the barcode image, after deskewing, in the horizontal and vertical directions, respectively (step S27). The barcode image used in this step may be the original scanned color image, or the grayscale image or binary image generated in step S21. The projections are curves of total pixel values vs. the horizontal and vertical position, respectively. In this embodiment, the multiple barcodes have the same size and layout, and are aligned with each other in the horizontal and vertical directions; thus, each projection (horizontal or vertical) will have a number of larger gaps or valleys corresponding to the spaces that separate the barcodes, and numerous smaller gaps or valleys corresponding to the spaces that separate the cells within the barcodes. As a result, the horizontal and vertical start and end positions of each barcode can be obtained.

Then, the bounding boxes found in step S25 are applied to the original scanned color image to locate the barcodes therein, the deskew angles calculated in step S26 are applied to deskew the bounding box, and the horizontal and vertical start and end positions found in step S27 are used to obtain image patches of the color image each containing an individual barcode (step S28). This completes the process of locating and deskewing the barcodes in the scanned color image.

Although details of the process of locating and deskewing the barcodes are described above, other suitable methods can also be used to locate and deskew the barcodes in the scanned color image.

Referring back to FIG. 1, in the next step, the correct orientation of the barcodes is determined by utilizing the asymmetry of the barcode layout (step S13). This step is necessary because the orientation of the barcodes may have been rotated when the document is scanned. As described earlier, the barcode layout design is asymmetrical regarding the four corner locators of the barcode. For example, for one and only one corner locator, two larger yellow border reference cells 13B are located adjacent to it. Based on this asymmetry, one of the corner locators is pre-defined as the reference corner locator, and the correct orientation of the barcode is defined such that the reference corner locator is located a pre-defined location such as the upper-left corner. In step S13, any suitable test may be used to take advantage of the asymmetry to determine which corner locator is the reference corner locator. The reference corner locator only needs to be found for one barcode on each page. Once the reference corner locator is found, the entire scanned image is rotated by an appropriate amount so that the reference corner locator is located at the pre-defined position such as the upper-left corner of the barcode.

Once the image orientation is corrected, the multiple barcodes in the image can be indexed, i.e. assigned index numbers following a pre-defined sequence such as starting from top to bottom and left to right (step S13). This way, the information contained in the multiple barcodes can be correctly strung together.

The data in each barcode can now be extracted (step S14). This step, applied to each barcode, is explained in more detail with reference to FIG. 2B.

First, the center positions of the four corner locators of the color barcode are determined, for example by using a cross correlation method (step S31). The positions of the grid points of the barcode are calculated using these center positions and the total number of grid points (horizontal and vertical) in the barcode, which are known (step S32). As pointed out earlier, all cells of the barcode are designed to have their centers located on the same grid. The total numbers of grid points in the horizontal and vertical directions are the total number of columns and rows, respectively, of data cells plus 4. Note that the centers of the corner locators are located at the second or the second-from-last grid point of the grid in both the horizontal and vertical direction.

Also note that because the distance between grid points is 5 pixels in this barcode design, each pixel corresponds to 0.2 grid points.

Next, the channel offset along the four borders is calculated (step S33). This is done by projecting each border to the axis parallel to that border, e.g., projecting the top horizontal border to the horizontal axis, etc. The projection curves will have a series of near-square peaks corresponding to the border reference cells, and a series of valleys corresponding to the gaps between them. The actual center position of each border reference cell is determined form the projection curve by finding the centers of the near-square peaks; the difference between the actual center position and the designed center position (i.e. what the center position should be according to the barcode design without channel offset) of each border reference cell (having a known color based on the barcode layout design) is the channel offset for that color at that position along the border. This way, the spatial offset of each color channel as a function of the position is obtained for a number of positions along each border.

In one implementation of step S33, the pixel values are converted from the RGB color values to a standard color space such as the CIE L*a*b* color space; four projection curves for the L*, a*, b* and a*+b* values are obtained for each border, and are used to locate the center positions of black, magenta, yellow and cyan border reference cells, respectively.

From step S33, the horizontal offset of each color channel along the top and bottom borders are obtained, and the vertical offset of each color channel along the left and right borders and also obtained. Using the channel offset information of the four borders, the local horizontal and vertical offsets of each color channel for any given position within the barcode can be calculated by interpolation. For example, for linear interpolation, the average offset of one channel on each border can be used. The following linear interpolations equations may be used to calculate the local channel offset for a data cell located at position (x,y) of the barcode (Eq. (1)):

$$dx(x,y)=[DX1*(H-y)+DX2*y]/H$$

$$dy(x,y)=[DY1*(W-x)+DY2*x]/W$$

In the above equations, dx(x,y) and dy(x,y) are respectively the x- and y-offset at position (x,y); DX1 and DX2 are respectively the average x-offset of all the same-colored border reference cells in the top border and in the bottom border; H and W are respectively the distance between the top and bottom borders and between the left and right borders; DY1 and DY2 are respectively the average y-offset of all the same-colored border reference cells in the left border and in the right border. Here, the x coordinate points to the right from the top-left corner, and the y coordinate points down from the top-left corner. Other suitable interpolation equations may be used.

It is expected that the channel offset is less than ±1 pixel; otherwise the data cells will likely merge with each other and the barcode cannot be decoded.

The color values of all pixels are converted from the RGB color space to a standard color space such as the CIE L*a*b* color space (step S34). Another example of standard color space is CIE L*u*v*. Any suitable conversion methods may be used for this step.

The reference color values, in the standard color space, for each of the four primary colors (color channels) CMYK are computed by averaging the colors of the border reference cells (step S35). This is a two step process for each color. First, the predicted actual position of each border reference cell of that color is calculated by adding a channel offset value to the designed position of the cell. The designed position is known from the barcode layout design; the channel offset is calculated using the interpolation method described earlier and then rounded to the nearest whole number. Note that for each border reference cell, the offset in the direction parallel to the border is already calculated from the projections in step S33, so only the offset in the direction perpendicular to the border needs to be calculated using interpolation. Then, the color values of pixels located within the predicted actual area, i.e. an area having the size of a reference cell and centered at the predicted actual position, are used for averaging. The reference color values (in the standard color space) for each primary color are calculated by averaging the pixel color values over all pixels in all border reference cells of that color. Note that typically, color variations across the size of one barcode are not significant; thus, all border reference cells for the same primary color are used to calculate the reference color values (L*a*b*) for that primary color.

Then, for each pixel within the area of the data cell array, the color difference between the pixel and the reference color values for each of the four primary colors CMYK as well as the white point W are computed (step S36). The color difference between any two CIE L*a*b* colors can be calculated using known equations, such as CIEDE94(2:1:1).

This gives five color difference values for each pixel: $DE_C$, $DE_M$, $DE_Y$, $DE_K$, and $DE_W$. Based on these color difference values, the probabilities of the pixel being C, M, Y or K in color, respectively, are calculated (step S37). The definitions of these probabilities (referred to as pixel color probabilities) are such that larger color difference value results in lower probabilities. In one implementation, the pixel color probabilities are defined as follows (Eq. (2)):

$$Prob(C) = \frac{(1/DE_C)^4}{(1/DE_C)^4 + (1/DE_M)^4 + (1/DE_Y)^4 + (1/DE_K)^4 + (1/DE_W)^4}$$

$$Prob(M) = \frac{(1/DE_M)^4}{(1/DE_C)^4 + (1/DE_M)^4 + (1/DE_Y)^4 + (1/DE_K)^4 + (1/DE_W)^4}$$

$$Prob(Y) = \frac{(1/DE_Y)^4}{(1/DE_C)^4 + (1/DE_M)^4 + (1/DE_Y)^4 + (1/DE_K)^4 + (1/DE_W)^4}$$

$$Prob(K) = \frac{(1/DE_K)^4}{(1/DE_C)^4 + (1/DE_M)^4 + (1/DE_Y)^4 + (1/DE_K)^4 + (1/DE_W)^4}$$

Thus, each pixel of the barcode image has four pixel color probabilities with respect to the four respective primary colors.

Then, for each data cell of the barcode, the cell color probabilities with respect to the plurality of colors, i.e. the probabilities of the data cell being C, M, Y or K color, respectively, are calculated using the pixel color probabilities (step S38). From the barcode layout design it is known that the designed positions of the data cells are centered on the grid points, which are calculated in step S32; however, the actual position of each printed data cell will be offset from the designed position by an offset amount that is dependent on the cell position and cell color. The actual offset is unknown because the cell color is yet unknown. Thus, for each data cell, four predicted positions corresponding to the four primary colors CMYK are calculated by adding the corresponding channel offset amounts to the designed position of the data cell. The respective channel offset amounts are calculated for the designed position using the interpolation method described earlier (e.g. Eq. (1)), and rounded to the nearest whole number. Then, the pixel color probabilities with respect to each primary color are summed over all pixels located within the predicted area, i.e. an area having the size of a data cell and centered at the predicted position for that primary color, to calculate the cell color probability with respect to that primary color, which is the probability of the data cell being that color. This way, four cell color probabilities with respect to the four primary colors are calculated for each data cell in step S38. The primary color corresponding to the highest cell color probability is determined to be the cell color of the data cell (step S39).

The color of the verification data cells 14 located near the lower-right corner can be determined using similar steps.

A bit string is assembled by converting the color of each data cell into 2 bits of data (step S40). Desired checking can be performed using the data length and ECC information extracted from the verification data cells. This concludes the process of extracting encoded data from each barcode (FIG. 1, step A14). The extracted data from multiple barcodes are assembled together, and desired further processing may be performed (FIG. 1, step S15).

In the embodiments described above, the primary colors for printing the color barcode are CMYK. The methods described above may also be applied to a printer that uses RGB as the primary colors for printing.

Figure 3:
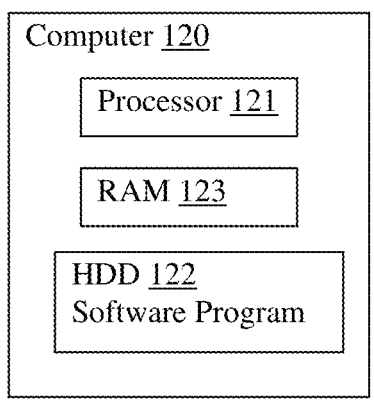
FIG. 3 schematically illustrates a data processing apparatus in which embodiments of the present invention may be implemented.

The two-dimensional color barcode generation and decoding methods described here can be implemented in a data processing system such as a computer 120 as shown in FIG. 3. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods.

In one aspect, the invention is a method carried out by a data processing system. In another aspect, the invention is computer program product embodied in computer usable non-transitory medium having a computer readable program code embedded therein for controlling a data processing apparatus to carry out the method. In another aspect, the invention is embodied in a data processing system.

It will be apparent to those skilled in the art that various modification and variations can be made in the two-dimensional color barcode and its generation and decoding methods of the present invention without departing from the spirit or scope of the invention. Thus, it is intended that the present invention cover modifications and variations that come within the scope of the appended claims and their equivalents.

What is claimed is:

1. A method for decoding a two-dimensional color barcode in a scanned image, the barcode having a known layout comprising a plurality of data cells forming a two-dimensional array containing a plurality of columns and rows separated by white spaces, a plurality of corner locator cells located at corners of the barcode, and a plurality of border reference cells forming four borders located between the corner locator cells and substantially surrounding the two-dimensional array of data cells, each data cell and border reference cell having one of a plurality of primary colors, the data cells and some of the border reference cells having identical sizes, the corner locator cells having a black color and a size larger than the size of the data cells, the border reference cells in each border between two corner locator cells having a predetermined repeating color sequence including the plurality of primary colors, the decoding method being performed by a processor programmed to execute the decoding method which comprises:

(a) calculating center positions of all data cells and border reference cells using positions of the corner locator cells;

(b) using all of the border reference cells, calculating a channel offset for each primary color at multiple positions along each border;

(c) calculating reference color values for each primary color by averaging color values of pixels in all border reference cells having the respective primary color;

(d) for each pixel within an area of the data cell array:

(d1) calculate a plurality of color difference values, each being a color difference between color values of the pixel and the reference color values of one of the primary colors or white;

(d2) based on the color difference values, calculating a plurality of pixel color probabilities with respect to the plurality of primary colors, each representing a probability of the pixel being the corresponding primary color;

(e) for each data cell:

(e1) calculating a plurality of predicted positions of the cell corresponding to the plurality of primary colors, each predicted position being calculated by adding a local channel offset for the corresponding primary color to the center position of the data cell calculated in step (a), wherein the local channel offset is calculated by interpolating the channel offset for the corresponding primary color at the multiple positions along the four borders calculated in step (b);

(e2) calculating a plurality of cell color probabilities with respect to the plurality of primary colors, each representing a probability of the data cell being the corresponding primary color, each being calculated by summing the pixel color probability with respect to the corresponding primary color over pixels located in an area having a size of the data cell and centered at the predicted position for the corresponding primary color;

(e3) determining a color of the data cell by comparing the plurality of cell color probabilities with respect to the plurality of primary colors; and (f) converting the colors of the data cells to digital data.

2. The method of claim 1, wherein step (a) comprises:

(a1) determining center positions of the plurality of corner locator cells; and (a2) based on the center positions of the corner locator cells and the known layout, calculating the center positions of all data cells and border reference cells.

3. The method of claim 1, wherein step (b) comprises:
(b1) determining horizontal center positions of each border reference cell in two horizontal ones of the borders and vertical center positions of each border reference cell in two vertical ones of the borders; and
(b2) based on the center positions determined in step (b1) and the known layout of the barcode including the designed position and color of each border reference cell, calculating the channel offset for each primary color at multiple positions along each border.

4. The method of claim 3, wherein step (b1) comprises projecting each border to an axis parallel to that border and determining centers of peaks in the projection.

5. The method of claim 1, further comprising, before step (c), converting color values of all pixels in the image into a standard color space, wherein the reference color values in step (c) and the color difference values in step (d1) are calculated in the standard color space.

6. The method of claim 5, wherein the plurality of primary colors are cyan, magenta, yellow and black, and wherein the standard color space is CIE L*a*b*.

7. The method of claim 6, wherein the plurality of pixel color probabilities with respect to the cyan, magenta, yellow and black colors are, respectively, $$Prob(C) = \frac{(1/DE_C)^4}{(1/DE_C)^4 + (1/DE_M)^4 + (1/DE_Y)^4 + (1/DE_K)^4 + (1/DE_W)^4}$$

$$Prob(M) = \frac{(1/DE_M)^4}{(1/DE_C)^4 + (1/DE_M)^4 + (1/DE_Y)^4 + (1/DE_K)^4 + (1/DE_W)^4}$$

$$Prob(Y) = \frac{(1/DE_Y)^4}{(1/DE_C)^4 + (1/DE_M)^4 + (1/DE_Y)^4 + (1/DE_K)^4 + (1/DE_W)^4}$$

$$Prob(K) = \frac{(1/DE_K)^4}{(1/DE_C)^4 + (1/DE_M)^4 + (1/DE_Y)^4 + (1/DE_K)^4 + (1/DE_W)^4}$$

wherein $DE_C$, $DE_M$, $DE_Y$, and $DE_K$ are the color difference values between the pixel color values and cyan, magenta, yellow, black and white calculated in step (d1).

8. The method of claim 1, wherein step (c) comprises, for each primary color:
(c1) for each border reference cell of the primary color, calculating a predicted position by adding a local channel offset for the primary color to the center position of the border reference cell calculated in step (a), wherein the local channel offset is calculated by interpolating the channel offset for the corresponding primary color at the multiple positions along the four borders calculated in step (b); and
(c2) averaging the color values of all pixels located within all areas having a size of the border reference cell and centered at the predicted positions of the border reference cells.

9. A computer program product comprising a computer usable non-transitory medium having a computer readable program code embedded therein for controlling a data processing apparatus, the computer readable program code being programmed to cause the data processing apparatus to execute a process for decoding a two-dimensional color barcode in a scanned image, the barcode having a known layout comprising a plurality of data cells forming a two-dimensional array containing a plurality of columns and rows separated by white spaces, a plurality of corner locator cells located at corners of the barcode, and a plurality of border reference cells forming four borders located between the corner locator cells and substantially surrounding the two-dimensional array of data cells, each data cell and border reference cell having one of a plurality of primary colors, the data cells and some of the border reference cells having identical sizes, the corner locator cells having a black color and a size larger than the size of the data cells, the border reference cells in each border between two corner locator cells having a predetermined repeating color sequence including the plurality of primary colors, the decoding process comprising:
(a) calculating center positions of all data cells and border reference cells using positions of the corner locator cells;
(b) using all of the border reference cells, calculating a channel offset for each primary color at multiple positions along each border;
(c) calculating reference color values for each primary color by averaging color values of pixels in all border reference cells having the respective primary color;
(d) for each pixel within an area of the data cell array:
(d1) calculate a plurality of color difference values, each being a color difference between color values of the pixel and the reference color values of one of the primary colors or white;
(d2) based on the color difference values, calculating a plurality of pixel color probabilities with respect to the plurality of primary colors, each representing a probability of the pixel being the corresponding primary color;
(e) for each data cell:
(e1) calculating a plurality of predicted positions of the cell corresponding to the plurality of primary colors, each predicted position being calculated by adding a local channel offset for the corresponding primary color to the center position of the data cell calculated in step (a), wherein the local channel offset is calculated by interpolating the channel offset for the corresponding primary color at the multiple positions along the four borders calculated in step (b);
(e2) calculating a plurality of cell color probabilities with respect to the plurality of primary colors, each representing a probability of the data cell being the corresponding primary color, each being calculated by summing the pixel color probability with respect to the corresponding primary color over pixels located in an area having a size of the data cell and centered at the predicted position for the corresponding primary color;
(e3) determining a color of the data cell by comparing the plurality of cell color probabilities with respect to the plurality of primary colors; and
(f) converting the colors of the data cells to digital data.

10. The computer program product of claim 9, wherein step (a) comprises:
(a1) determining center positions of the plurality of corner locator cells; and
(a2) based on the center positions of the corner locator cells and the known layout, calculating the center positions of all data cells and border reference cells.

11. The computer program product of claim 9, wherein step (b) comprises:
(b1) determining horizontal center positions of each border reference cell in two horizontal ones of the borders and vertical center positions of each border reference cell in two vertical ones of the borders; and
(b2) based on the center positions determined in step (b1) and the known layout of the barcode including the designed position and color of each border reference cell, calculating the channel offset for each primary color at multiple positions along each border.

12. The computer program product of claim 11, wherein step (b1) comprises projecting each border to an axis parallel to that border and determining centers of peaks in the projection.

13. The computer program product of claim 9, wherein the process further comprises, before step (c), converting color values of all pixels in the image into a standard color space, wherein the reference color values in step (c) and the color difference values in step (d1) are calculated in the standard color space.

14. The computer program product of claim 13, wherein the plurality of primary colors are cyan, magenta, yellow and black, and wherein the standard color space is CIE L*a*b*.

15. The computer program product of claim 14, wherein the plurality of pixel color probabilities with respect to the cyan, magenta, yellow and black colors are, respectively, $$Prob(C) = \frac{(1/DE_C)^4}{(1/DE_C)^4 + (1/DE_M)^4 + (1/DE_Y)^4 + (1/DE_K)^4 + (1/DE_W)^4}$$

$$Prob(M) = \frac{(1/DE_M)^4}{(1/DE_C)^4 + (1/DE_M)^4 + (1/DE_Y)^4 + (1/DE_K)^4 + (1/DE_W)^4}$$

$$Prob(Y) = \frac{(1/DE_Y)^4}{(1/DE_C)^4 + (1/DE_M)^4 + (1/DE_Y)^4 + (1/DE_K)^4 + (1/DE_W)^4}$$

$$Prob(K) = \frac{(1/DE_K)^4}{(1/DE_C)^4 + (1/DE_M)^4 + (1/DE_Y)^4 + (1/DE_K)^4 + (1/DE_W)^4}$$

wherein $DE_C$, $DE_M$, $DE_Y$, and $DE_K$ are the color difference values between the pixel color values and cyan, magenta, yellow, black and white calculated in step (d1).

16. The computer program product of claim 9, wherein step (c) comprises, for each primary color:

(c1) for each border reference cell of the primary color, calculating a predicted position by adding a local channel offset for the primary color to the center position of the border reference cell calculated in step (a), wherein the local channel offset is calculated by interpolating the channel offset for the corresponding primary color at the multiple positions along the four borders calculated in step (b); and (c2) averaging the color values of all pixels located within all areas having a size of the border reference cell and centered at the predicted positions of the border reference cells.

* * * * *